United States Patent
Zheng et al.

(10) Patent No.: US 11,163,728 B2
(45) Date of Patent: Nov. 2, 2021

(54) SHARING CONTAINER IMAGES UTILIZING A SHARED STORAGE SYSTEM

(71) Applicant: International Business Machines Corporation, Armonk, NY (US)

(72) Inventors: Chao Zheng, Cupertino, CA (US); Lukas Rupprecht, San Jose, CA (US); Vasily Tarasov, Port Jefferson Station, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/147,215

(22) Filed: Sep. 28, 2018

(65) Prior Publication Data

US 2020/0104385 A1  Apr. 2, 2020

(51) Int. Cl.
*A63F 9/24* (2006.01)
*G07F 17/32* (2006.01)
(Continued)

(52) U.S. Cl.
CPC ............ *G06F 16/1774* (2019.01); *G06F 8/63* (2013.01); *G06F 9/455* (2013.01); *G06F 9/5077* (2013.01); *G06F 9/52* (2013.01)

(58) Field of Classification Search
CPC .......... G06F 16/1774; G06F 8/63; G06F 8/61; G06F 9/455; G06F 9/5077; G06F 9/52; G06F 9/452; G06F 21/105; G06F 21/121; G06F 21/10; G06F 21/125; G06F 9/45558; G06F 3/067; G06F 3/061; G06F 3/0641; G06F 3/0608; G06F 3/0683; G06F 16/1748; G06F 16/27; G06F 16/178; G06F 11/004; G06F 11/2094; G06F 16/128; G06F 16/1752; G06F 8/71; G06F 8/34; G06F 8/20; G06F 8/30; G06F 11/3672; G06F 2221/2135; G06F 2221/0737; G06F 2221/2101; G06Q 10/10; H04L 67/1095;
(Continued)

(56) References Cited

U.S. PATENT DOCUMENTS

2006/0026105 A1\* 2/2006 Endoh .................... G06F 21/10
                                                                     705/59
2007/0050301 A1\* 3/2007 Johnson ................. G06F 21/10
                                                                     705/59
(Continued)

OTHER PUBLICATIONS

Noorian et al., Autonomic Software License Management System: An Implementation of Licensing Patterns, 7 pages (Year: 2009).\*
(Continued)

*Primary Examiner* — Thuy Dao
(74) *Attorney, Agent, or Firm* — Zilka-Kotab, P.C.

(57) ABSTRACT

According to one embodiment, a computer program product for managing contention includes a computer readable storage medium that has program instructions embodied therewith, where the computer readable storage medium is not a transitory signal per se, and where the program instructions are executable by a processor to cause the processor to perform a method including incrementing, by the processor, a counter associated with an image in response to a creation of a container instance using the image, comparing, by the processor, the counter to a threshold value, and conditionally replicating the image by the processor, based on the comparing.

18 Claims, 12 Drawing Sheets

(51) Int. Cl.

| | |
|---|---|
| *A63F 13/00* | (2014.01) |
| *G06F 9/455* | (2018.01) |
| *G06F 21/10* | (2013.01) |
| *G06F 9/50* | (2006.01) |
| *H04L 29/06* | (2006.01) |
| *G06F 16/176* | (2019.01) |
| *G06F 8/61* | (2018.01) |
| *G06F 9/52* | (2006.01) |

(58) Field of Classification Search
CPC ..... H04L 63/20; G07F 17/32; G07F 17/3288; G07F 17/3293; G07F 17/3244; G07F 17/3276
See application file for complete search history.

(56) References Cited

U.S. PATENT DOCUMENTS

| | | | |
|---|---|---|---|
| 2008/0250221 A1 | 10/2008 | Holt | |
| 2009/0199299 A1* | 8/2009 | McKinnon | G06F 21/10 726/26 |
| 2011/0179082 A1 | 7/2011 | Vaghani et al. | |
| 2013/0054801 A1* | 2/2013 | Belchee | G06F 21/105 709/225 |
| 2013/0198085 A1* | 8/2013 | Li | G06F 21/105 705/59 |
| 2016/0259922 A1* | 9/2016 | Matsuo | G06F 21/12 |
| 2016/0314447 A1* | 10/2016 | Trevathan | G06Q 30/0609 |

OTHER PUBLICATIONS

Zheng et al., "Wharf: Sharing Docker Images across Hosts from a Distributed Filesystem," SC'17, Nov. 2017, 2 pages.

Mirkin et al., "Containers checkpointing and live migration," Proceedings of the Linux Symposium, vol. 2, 2008, 8 pages.

Dua et al., "Virtualization vs Containerization to support PaaS," IEEE International Conference on Cloud Engineering, 2014, pp. 610-614.

Naik, N., "Building a Virtual System of Systems Using Docker Swarm in Multiple Clouds," IEEE International Symposium on Systems Engineering, 2016, 3 pages.

Pletka et al., "Cryptographic Security for a High-Performance Distributed File System," IBM Research GmbH, Research Report, Sep. 11, 2006, 19 pages.

Marian et al., "Tempest: Soft State Replication in the Service Tier," IEEE International Conference on Dependable Systems and Networks With FTCS and DCC, 2008, pp. 1-10.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

GitHub, "harbor," GitHub, 2018, 3 pages, retrieved from https://github.com/goharbor/harbor.

Wilson, D., "Architecture for a Fully Decentralized Peer-to-Peer Collaborative Platform," Thesis, University of Ottawa, 2015, 152 pages, retrieved from http://citeseerx.ist.psu.edu/viewdoc/download?doi=10.1.1.905.9040&rep=rep1&type=pdf.

Wikipedia, "Peer-to-peer," Wikipedia, 2018, 14 pages, retrieved from https://en.wikipedia.org/wiki/Peer-to-peer.

GitHub, "Dragonfly," GitHub, 2018, 4 pages, retrieved from https://github.com/dragonflyoss/Dragonfly.

Harter et al., "Slacker: Fast Distribution with Lazy Docker Containers," Proceedings of the 14th USENIX Conference on File and Storage Technologies, Feb. 2016, 16 pages.

Canon et al., "Shifter: Containers for HPC," Canon & Jacobsen Cray User Group, 2016, 8 pages, retrieved from https://cug.org/proceedings/cug2016_proceedings/includes/files/pap103s2-file1.pdf.

Nathan et al., "CoMICon: A Co-operative Management System for Docker Container Images," IEEE International Conference on Cloud Engineering, 2017, pp. 116-126.

* cited by examiner

1100

┌─────────────────────────────────────────────────────────┐
│ Write, by a Daemon Within a Node of a System, a First Update to │
│ an Image, Where the First Update is Written to Local             │—1102
│ Storage Within the Node                                          │
└─────────────────────────────────────────────────────────┘
                              ↓
┌─────────────────────────────────────────────────────────┐
│ Write, by the Daemon Within the Node of the System, a Second    │
│ Update to the Image, Where the Second Update is Written to      │—1104
│ the Local Storage Within the Node                                │
└─────────────────────────────────────────────────────────┘
                              ↓
┌─────────────────────────────────────────────────────────┐
│ Write, the First Update to the Image and the Second Update to   │—1106
│ the Image as a Single Write to Shared Storage Within the System │
└─────────────────────────────────────────────────────────┘

FIG. 11

SHARING CONTAINER IMAGES UTILIZING A SHARED STORAGE SYSTEM

BACKGROUND

The present invention relates to software containers, and more specifically, this invention relates to sharing container images and managing locks, contention, and migration within a containerized environment.

Due to the inherent performance overhead of traditional virtual machines (VMs), the high-performance computing (HPC) community has avoided using virtualization technology for a long time. With the rise of lightweight container technology, it has now become possible for HPC clusters, AI training clusters, and other processing-intensive computing clusters to deliver an isolated environment with acceptable overhead. Compared to VMs, containers share the operating system kernel which reduces overhead.

The use of containers in HPC environments is still difficult as containerized environments currently cannot be deployed efficiently on shared storage. However, this is a crucial requirement in large-scale HPC clusters because they are often diskless or access data via a shared burst-buffer layer. This lack of shared storage support can lead to overhead when running containerized HPC applications.

SUMMARY

According to one embodiment, a computer program product for managing contention includes a computer readable storage medium that has program instructions embodied therewith, where the computer readable storage medium is not a transitory signal per se, and where the program instructions are executable by a processor to cause the processor to perform a method including incrementing, by the processor, a counter associated with an image in response to a creation of a container instance using the image, comparing, by the processor, the counter to a threshold value, and conditionally replicating the image by the processor, based on the comparing.

According to another embodiment, a computer program product for managing migration includes a computer readable storage medium that has program instructions embodied therewith, where the computer readable storage medium is not a transitory signal per se, and where the program instructions are executable by a processor to cause the processor to perform a method including identifying, by the processor, a failure of a first daemon within a first node of a system, where a container instance was created by the first daemon at the first node, utilizing an image updated by the first daemon stored at a shared storage, accessing, by the processor at a second daemon within a second node, the image updated by the first daemon stored at the shared storage, and creating a copy of the container instance by the processor at the second daemon within the second node, utilizing the image updated by the first daemon stored at the shared storage.

According to yet another embodiment, a computer program product for implementing a local writeable layer includes a computer readable storage medium that has program instructions embodied therewith, where the computer readable storage medium is not a transitory signal per se, and where the program instructions are executable by a processor to cause the processor to perform a method comprising writing, by the processor at a daemon within a node of a system, a first update to an image, where the first update is written to local storage within the node, writing, by the processor at a daemon within the node of the system, a second update to the image, where the second update is written to the local storage within the node, and writing, by the processor, the first update to the image and the second update to the image as a single write to shared storage within the system.

A computer-implemented method according to another embodiment includes receiving a first request from a first daemon to write data to all or a portion of an image, locking all or the portion of the image, in response to the first request, receiving a second request from a second daemon to write data to all or a portion of the image, and conditionally blocking the second request, based on the locking.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 11 illustrates a flowchart of a method for implementing a local writeable layer within a shared image containerized environment, in accordance with one embodiment.

DETAILED DESCRIPTION

Figure 1:
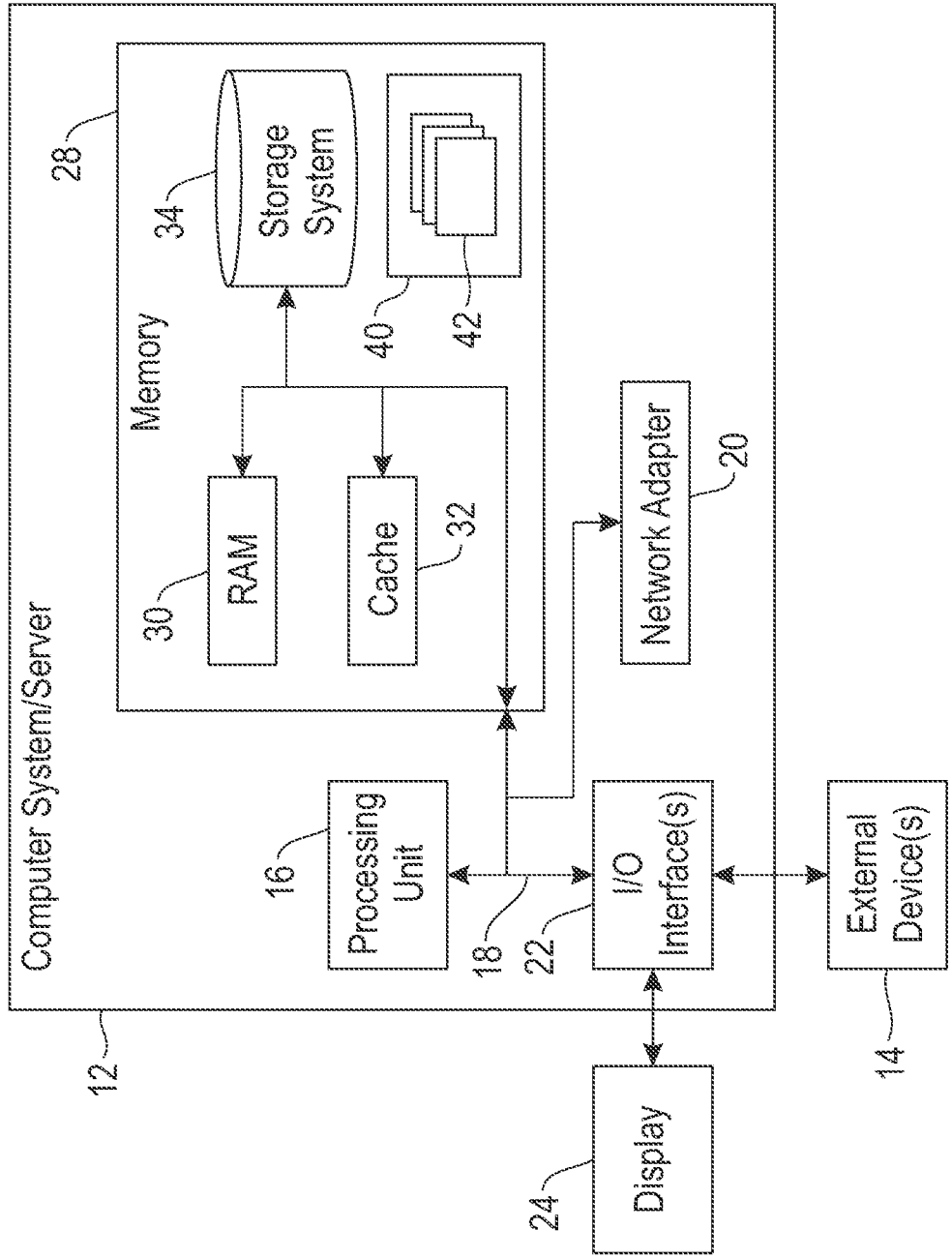
FIG. 1 depicts a cloud computing node according to an embodiment of the present invention.

The following description discloses several preferred embodiments of systems, methods and computer program products for sharing container images utilizing a shared storage system. Various embodiments provide a method for managing locks, contention, and migration within a containerized environment, as well as implementing a local writeable layer within a containerized environment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for sharing container images utilizing a shared storage system.

In one general embodiment, a computer program product for managing contention includes a computer readable storage medium that has program instructions embodied therewith, where the computer readable storage medium is not a transitory signal per se, and where the program instructions are executable by a processor to cause the processor to perform a method including incrementing, by the processor, a counter associated with an image in response to a creation of a container instance using the image, comparing, by the processor, the counter to a threshold value, and conditionally replicating the image by the processor, based on the comparing.

In another general embodiment, a computer program product for managing migration includes a computer readable storage medium that has program instructions embodied therewith, where the computer readable storage medium is not a transitory signal per se, and where the program instructions are executable by a processor to cause the processor to perform a method including identifying, by the processor, a failure of a first daemon within a first node of a system, where a container instance was created by the first daemon at the first node, utilizing an image updated by the first daemon stored at a shared storage, accessing, by the processor at a second daemon within a second node, the image updated by the first daemon stored at the shared storage, and creating a copy of the container instance by the processor at the second daemon within the second node, utilizing the image updated by the first daemon stored at the shared storage.

In another general embodiment, a computer program product for implementing a local writeable layer includes a computer readable storage medium that has program instructions embodied therewith, where the computer readable storage medium is not a transitory signal per se, and where the program instructions are executable by a processor to cause the processor to perform a method comprising writing, by the processor at a daemon within a node of a system, a first update to an image, where the first update is written to local storage within the node, writing, by the processor at a daemon within the node of the system, a second update to the image, where the second update is written to the local storage within the node, and writing, by the processor, the first update to the image and the second update to the image as a single write to shared storage within the system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
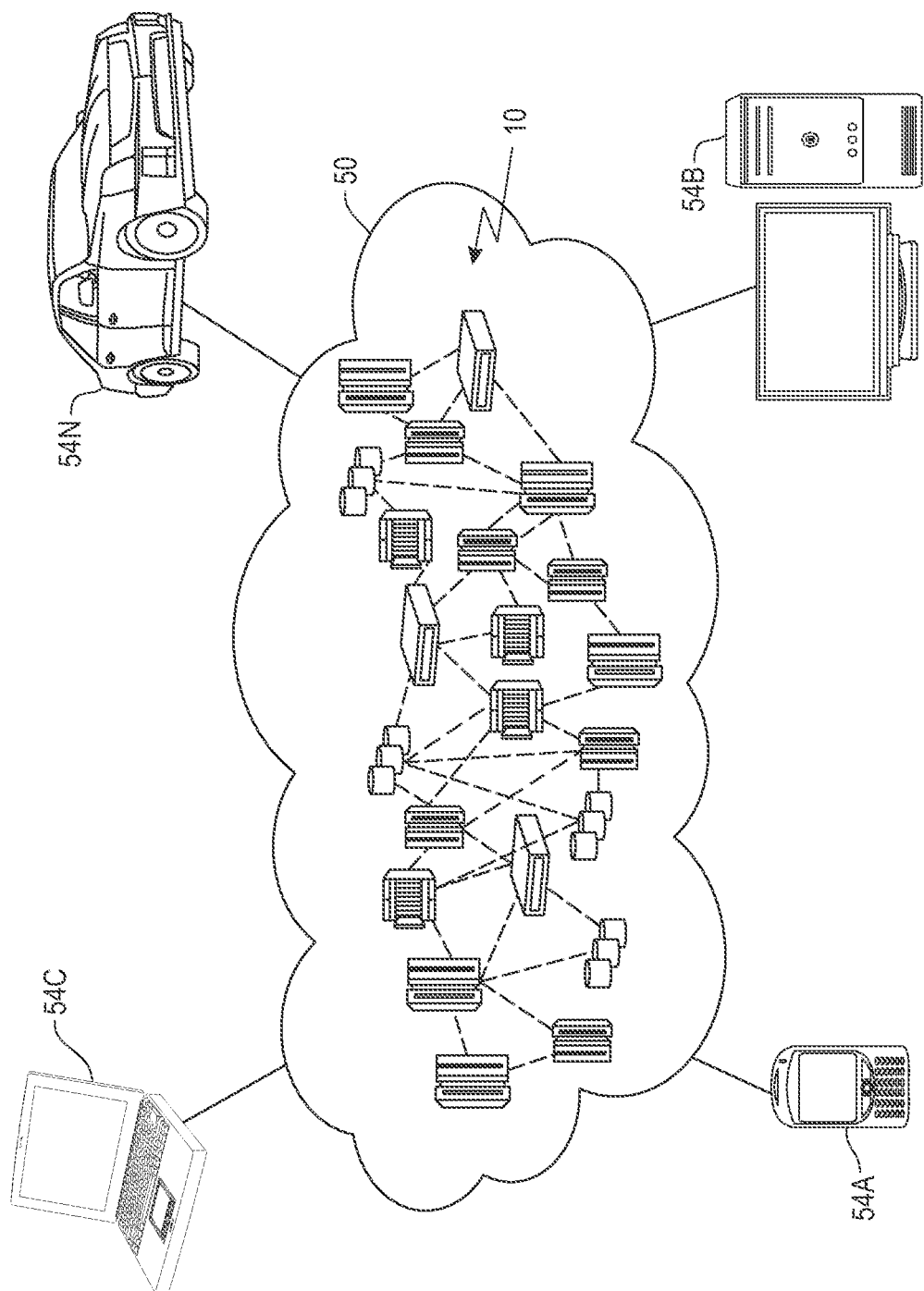
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
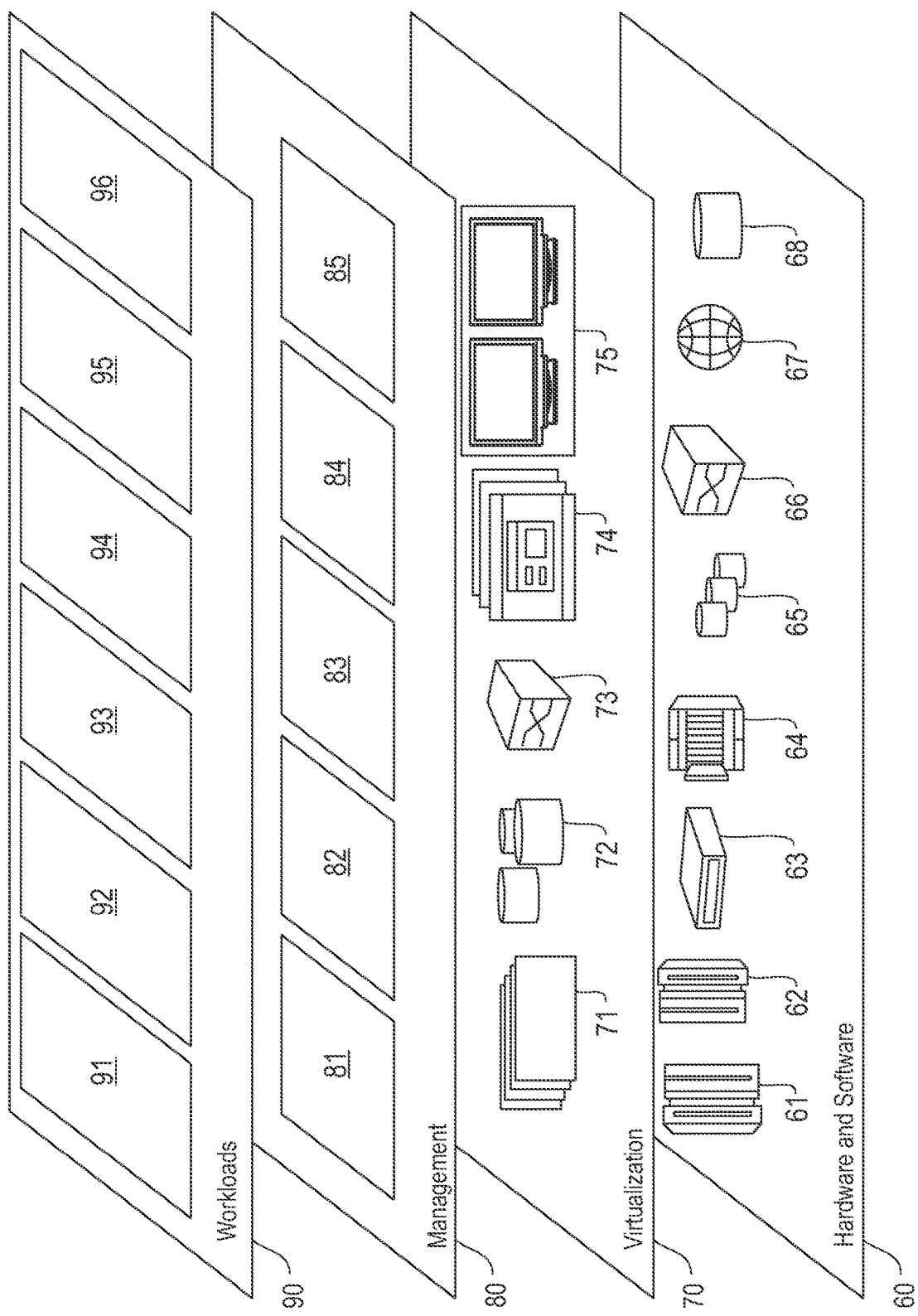
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and containerization implementation and management 96.

Figure 4:
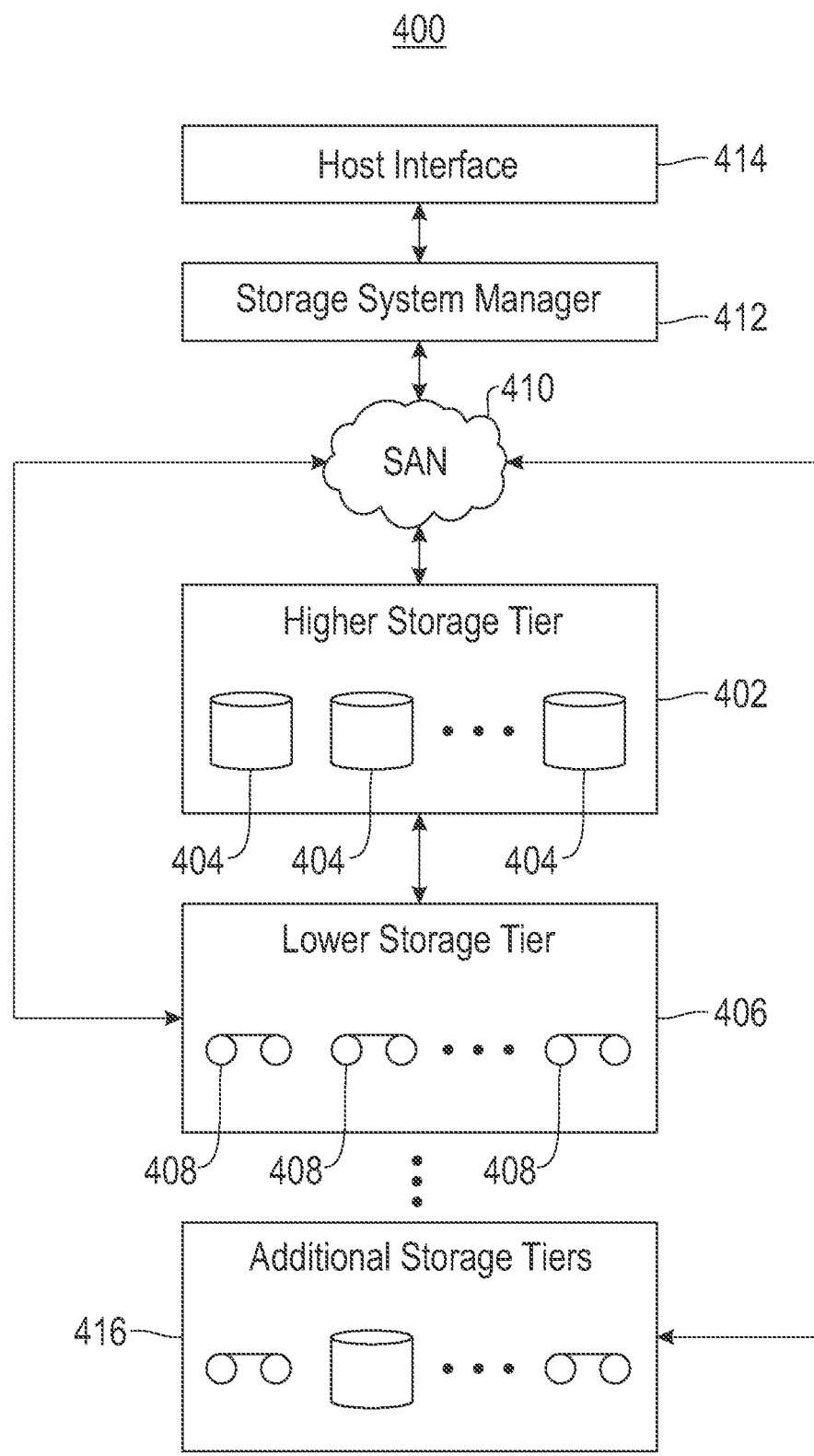
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

In one embodiment, a shared container image store may be implemented for large-scale clusters. A shared layer between the containerized environment and a storage system may allow multiple container daemons to efficiently access and share container images from a shared storage system (e.g., a shared file system, an NAS, a SAN, etc.). This implementation may be independent of the underlying file system and may minimize the synchronization overhead for accessing the shared images between different daemons. In addition, instead of fetching the whole image, data may be retrieved from the remote storage only if it is used by the container. This may reduce a network overhead.

Additionally, in one embodiment, a daemon may store its persistent state about network, volumes, plugins, images, layers, and containers in a "data root" directory. Daemons can read from the data root (e.g. list all the available images or start a container with the required image data) and write to the data root (e.g. store a new image or update an existing layer). The content of the data root may be divided into two parts: a local state and a shared state.

The local state comprises all data that is inherently local to a single daemon and cannot be shared (e.g., configuration data related to container networking, volumes, plugins, etc.). This data may be stored separately for each daemon. If local storage is available, it may be used for the local state of each daemon. Otherwise, separate directories may be created on the shared storage, or a temporary in-memory file system may be used.

Further, in one embodiment, a shared state comprises the content that is accessible by all daemons. This may include image metadata and the actual image layers. This may be stored in a shared location, and the access to this data may be synchronized between different daemons. In another embodiment, a layered structure of Docker images may be used to minimize synchronization overhead by performing locking at a layer granularity (and not an image granularity).

Further still, in one embodiment, a layer may be implemented between daemons and shared storage. It may include at least three components: (i) a locking manager to handle concurrent accesses to shared content; (ii) a contention manager to replicate popular layers on demand based on pluggable policies; and (iii) a migration manager, which is responsible for container migration.

Locking Manager

Figure 5:
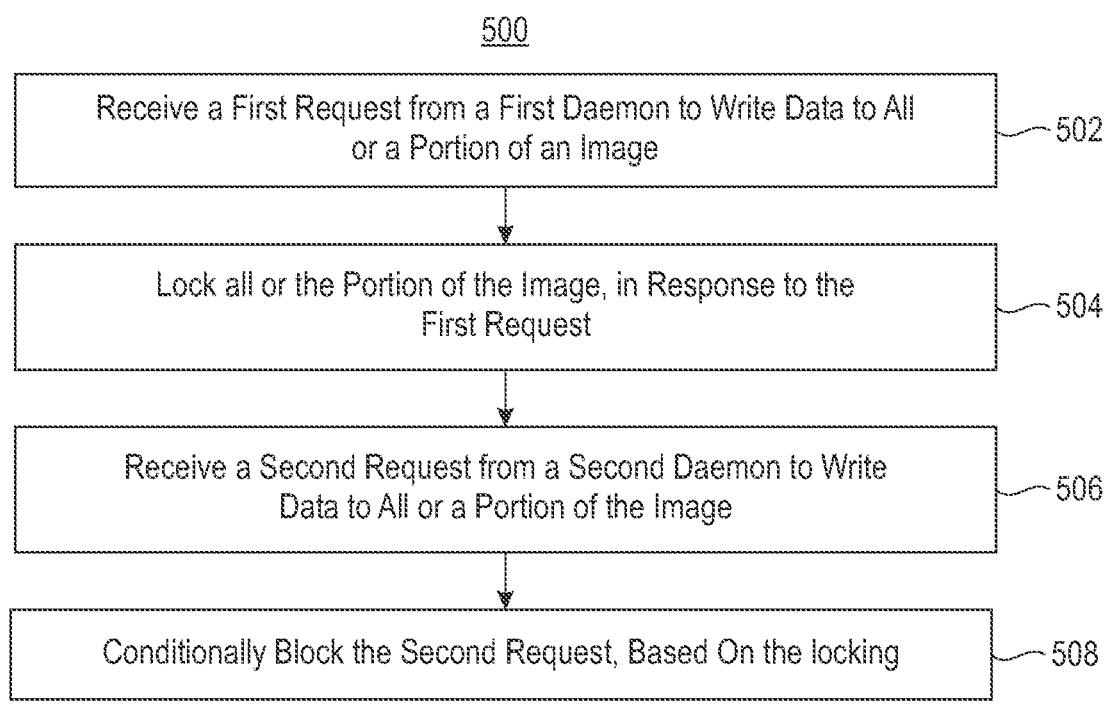
FIG. 5 illustrates a flowchart of a method for implementing granular image locking, in accordance with one embodiment.

Now referring to FIG. 5, a flowchart of a method 500 for implementing granular image locking is shown according to one embodiment. The method 500 may be performed in accordance with the present invention in any of the environments depicted in FIGS. 1-4, 6, 8, 10, and 12, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a first request is received from a first daemon to write data to all or a portion of an image. In another embodiment, the image may include a template used to create a container instance within the containerized environment. In yet another embodiment, the image may be stored in shared storage.

Additionally, in one embodiment, the image may include one or more layers. In another embodiment, the daemon may include a service running on a node within a system. For example, the node may include a compute node (e.g., a computing device such as a server, etc.), and the system may include a computing system (e.g., a high-performance computing (HPC) system, an artificial intelligence (AI) training system, etc.). In yet another embodiment, the daemon may include a local server process running on a node (e.g., a compute node of a compute node cluster, etc.) that is responsible for managing local images and spawning/running containers.

Further, in one embodiment, one or more daemons may each create a container instance utilizing a single image within the shared storage. For example, a daemon may create a container instance by combining multiple shared read only layers and a dedicated writable layer within an image. In another embodiment, the first request may include a request to write updated metadata from a memory of the first daemon to all or a portion of the image within the shared storage. In another embodiment, the first request may include a request to update metadata within a portion of the image (e.g., one or more individual layers of the image, etc.). In yet another embodiment, the first request may include a request to update metadata within an entire image.

Further still, method 500 may proceed with operation 504, where all or the portion of the image is locked, in response to the first request. In one embodiment, each daemon within a system may include a local state and a shared global state. For example, the local state may be exclusive to the daemon and may not be shared. In another example, the local state may be stored locally at the daemon, or may be stored within shared storage (e.g., the stared storage layer, etc.). In yet another example, the local state may include information on container instances. For instance, the local state may include container instances that have been created, that are currently running, etc.

Also, in one embodiment, the local state may include network, volume, and plugin configuration information. In another embodiment, the shared global state may be shared by a daemon with all other daemons within the system. In yet another embodiment, the shared global state may be stored within shared storage (e.g., the stared storage layer, etc.). In still another embodiment, the shared global state may include information associated with images (e.g., image structure, etc.). In another embodiment, the shared global state may include the images themselves.

In addition, in one embodiment, the shared global state may include metadata that is synchronized across all daemons within the system via a shared file. In this way, all daemons within a system may know all images that are stored within the shared storage, as well as a status of those images. In another embodiment, the locking may include updating metadata within the shared global state to indicate a lock for the first daemon in association with all or the portion (e.g., one or more layers, etc.) of the image to which the first daemon is requesting to write data.

Furthermore, in one embodiment, the locking may be performed in response to determining that no lock is currently associated with the requested image/portion of the image. For example, the locking may be denied in response to determining that a lock is currently associated with the requested image/portion of the image.

Further still, method 500 may proceed with operation 506, where a second request is received from a second daemon to write data to all or a portion of the image. In one embodiment, the second daemon may be different from the first daemon. For instance, the first daemon may be running on a first compute node, and the second daemon may be running on a second compute node separate from the first compute node. In another embodiment, the second request may include a request to write updated metadata from a memory of the second daemon to all or a portion of the image within the shared storage.

Also, in one embodiment, the second request may include a request to update metadata within a portion of the image (e.g., an individual layer of the image, etc.). In another embodiment, the second request may include a request to update metadata within an entire image.

Additionally, method 500 may proceed with operation 508, where the second request is conditionally blocked, based on the locking. In one embodiment, it may be determined whether a lock for the image (or portion of the image) requested to be written to by the second daemon is currently held by another daemon. In another embodiment, if the second request from the second daemon includes a request to write data to a layer of the image that currently has an associated lock not held by the second daemon, the second request may be blocked. For example, if the metadata within the shared global state indicates a lock held by the first daemon in association with a layer of the image, and the second request include a request to write data to that layer, the second request may be blocked.

Further, in one embodiment, if the second request from the second daemon includes a request to write data to an entire image that currently has an associated lock not held by the second daemon, the second request may be blocked. For example, if the metadata within the shared global state indicates a lock held by the first daemon in association with the entire image, and the second request include a request to write data to the image, the second request may be blocked. In another embodiment, if the second request from the second daemon includes a request to write data to a layer, and the layer does not currently have an associated lock, the second request may be allowed. For example, a lock may then be provided to the second daemon for the layer (e.g., by updating metadata within the shared global state to indicate a lock for the second daemon in association with the layer).

Further still, in one embodiment, if the second request from the second daemon includes a request to write data to an entire image, and the image does not currently have an associated lock, the second request may be allowed. For example, a lock may then be provided to the second daemon for the entire image (e.g., by updating metadata within the shared global state to indicate a lock for the second daemon in association with the entire image).

Also, in one embodiment, a third request may be received by the first daemon to read data from all or a portion of the image. For example, all or the portion of the image associated with the third request may not be locked in response to the read request. In another embodiment, a fourth request may be received by the second daemon to read data from all or a portion of the image. For example, in response to determining that all or the portion of the image associated with the third request is the same as all or the portion of the image associated with the fourth request, the fourth request may not be blocked, since no lock is held and the request is a read request (and not a write request).

In this way, a lock may be implemented for all or a portion of an image during a writing of data to the image. This may prevent writing to the same image/portion of the image concurrently by different daemons. Additionally, the lock may be applied at a fine-grained level only to a portion of the image that is to be written to in response to a request. This may enable the simultaneous access of different layers of a single image, which may increase a speed of data fetching by the daemons, and may increase a layer reuse rate by the daemons. Additionally, redundant fetches of the same layer may be avoided.

In one embodiment, a daemon uses in-memory data structures to cache a global state. To correctly share images, consistency of the cached in-memory data and the persisted data on disk may need to be ensured. To achieve this, a locking manager synchronizes the in-memory metadata across all daemons via a shared file. When a daemon reads its in-memory data, it first checks whether the shared file has been updated. If the shared file has been updated, the daemon will re-read it and update its in-memory state.

Read accesses to the shared file may happen concurrently. In one embodiment, every time a daemon updates (e.g., writes to) its in-memory metadata, it locks this shared file and flushes the updates so that they become visible to other daemons. To ensure a high degree of concurrency for write accesses, fine-grained locking is supported at a layer granularity which only blocks writes accesses if they affect the same layer. This ensures high performance as different images and layers can be modified concurrently without interference.

Additionally, in one embodiment, a shared image management interface may be implemented to allow to plug in different shared locking mechanisms. In another embodiment, a read/write locking mechanism may be implemented via a fcntl system call, which is part of the POSIX standard and is supported by most shared file systems. However, any shared locking implementations may be used.

Figure 6:
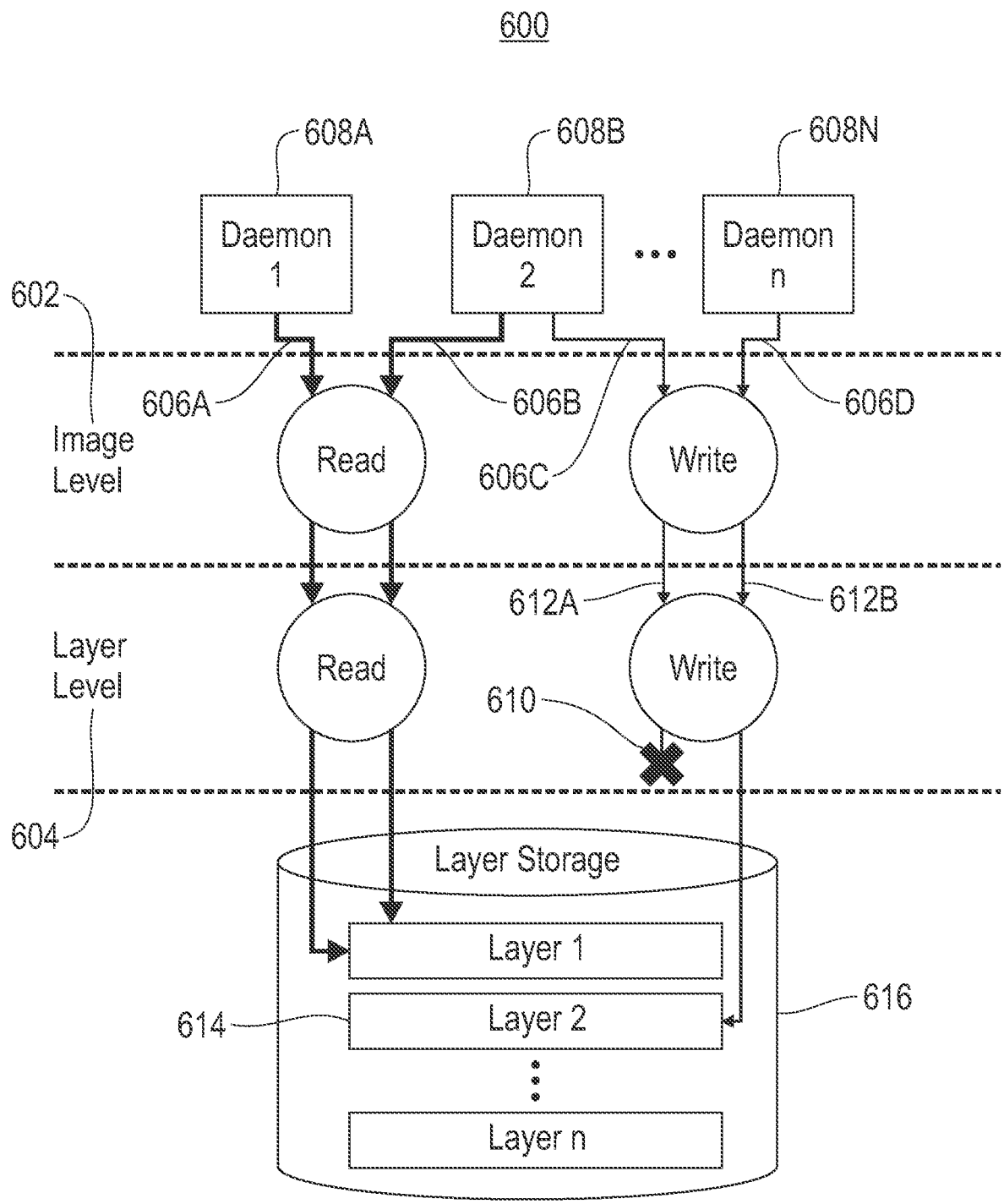
FIG. 6 illustrates an exemplary fine-grained layer locking implementation, in accordance with one embodiment.

FIG. 6 illustrates an exemplary fine-grained layer locking implementation 600, according to one exemplary embodiment. As shown in FIG. 6, each container operation is divided into two levels, an image level 602 and a layer level 604. On the image level 602, all operations can be processed concurrently, regardless of read or write access. On the layer level 604, read accesses to the same layers can be processed in parallel, while only one write access to a layer can be processed.

For example, concurrent reads 606A and 606B from different daemons 608A and 608B may be allowed at both the image level 602 and the layer level 604. Concurrent writes 606C and 606D from different daemons 608B and 608N may be allowed at the image level 602, but a write lock 610 may be implemented at the layer level 604, which may prevent a conflict between concurrent writes 612A and 612B to the same second layer 614 within layer storage 616.

By using the fine-grained layer lock, the fetching of images may be accelerated by pulling multiple layers within layer storage 616 simultaneously through different daemons 608A-N. Such layers may be pulled from an image registry. Additionally, a layer reuse rate may be increased by enabling different daemons 608A-N to read the same layers at the same time. Additionally, redundant fetches of the same layer (in this example, the second layer 614) may be prevented. In this way, fine-grained locking may be used at a layer granularity to efficiently support concurrent image pulls into a shared storage layer.

Contention Manager

Figure 7:
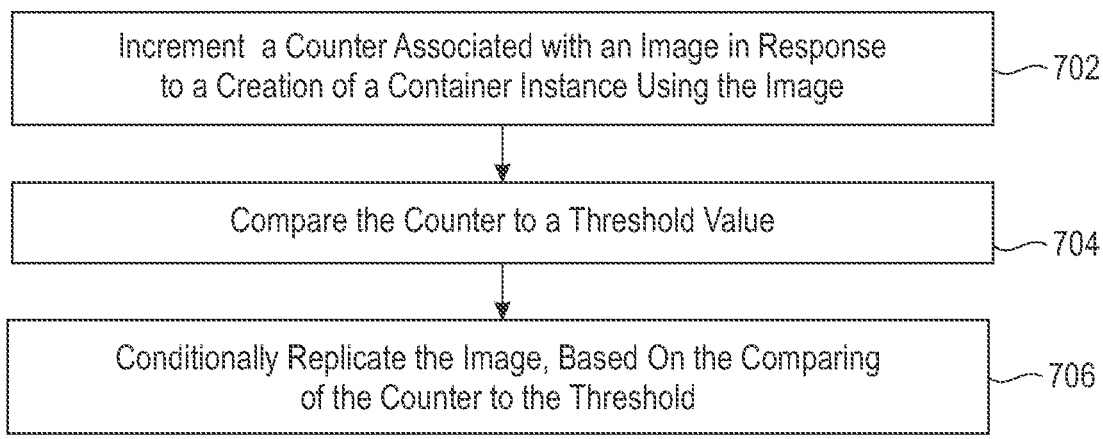
FIG. 7 illustrates a flowchart of a method for managing image contention in a shared environment, in accordance with one embodiment.

Now referring to FIG. 7, a flowchart of a method 700 for managing image contention in a shared environment is shown, according to one embodiment. The method 700 may be performed in accordance with the present invention in any of the environments depicted in FIGS. 1-4, 6, 8, 10, and 12, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a counter associated with an image is incremented in response to a creation of a container instance using the image. In one embodiment, the image may be a component of a containerized environment. In another embodiment, the image may include a template used to create a container instance within the containerized environment. In yet another embodiment, the image may be stored in shared storage.

For example, the image may be stored in a shared storage layer that includes shared storage shared by a plurality of different daemons. In another example, each of the plurality of different daemons may run on a separate compute node within a compute layer separate from the shared storage layer. In yet another example, one or more of the plurality of different daemons may each create a container instance utilizing a single image stored at the shared storage layer.

Additionally, in one embodiment, the image may include one or more layers. For example, the image may include a single layer, or a plurality of different layers. In another example, each layer may include one or more instructions used to create a container image by a daemon. In another embodiment, the container instance may be created by a daemon, utilizing the image.

Further, in one embodiment, the daemon may include a service running on a node within a system. For example, the node may include a compute node, and the system may include a computing system (e.g., a high-performance computing (HPC) system, an artificial intelligence (AI) training system, etc.). In another embodiment, one or more daemons, each on a separate compute node, may each create a container instance at their respective nodes utilizing a single image within the shared storage.

Further still, in one embodiment, the counter may include a global reference counter. In another embodiment, the counter may include an integer value that is incremented each time a container instance is created utilizing the image. In yet another embodiment, a separate counter may be associated with each image stored within the system (e.g., within the shared storage of the system). For example, the counter for one image may be different from counters for all other images within the system. In this way, the counter may represent a number of container instances spawned from the image across all daemons within a system.

Also, method 700 may proceed with operation 704, where the counter is compared to a threshold value. In one embodiment, the threshold value may include an integer value. In another embodiment, the threshold value may be determined based on a system setup (e.g., a number of compute nodes within a compute cluster, etc.).

In addition, method 700 may proceed with operation 706, where the image is conditionally replicated, based on the comparing of the counter and the threshold. In one embodiment, the image may be replicated in response to determining that the counter exceeds the threshold value. In another embodiment, replicating the image includes creating a second instance of the image. For example, the replicated image may be the same as the image. In another example, the replicated image may be created within the shared storage.

Furthermore, in one embodiment, a new counter may be associated with the replicated image. In another embodiment, the threshold value may be increased in response to replicating the image. For example, if the threshold value is represented by integer value X, and the counter is represented by integer value Y, a first replication of the image may be created when Y>X. In another example, once the first replication of the image is created, the threshold value X may be increased by an integer multiplier value. For instance, the threshold value X may be updated to become 2*X.

Further still, in one embodiment, additional container instances may be created utilizing the first replication of the image (and not the original image), and the counter Y may be incremented each time an additional container instance is created. In another embodiment, when Y>2*X, a second replication of the image may be created, and the threshold value X may be increased again by an integer multiplier value. For example, the threshold value X may be updated to become 3*X.

Also, in one embodiment, additional container instances may be created utilizing the second replication of the image (and not the first replication of the image or the original image), and the counter Y may be incremented each time an additional container instance is created. In another embodiment, the counter associated with an image may be decremented in response to the removal of a container instance that was created using the image.

Additionally, in one embodiment, a replication of the image may be removed in response to determining that the counter no longer exceeds the threshold value. For example, utilizing the above example, as container instances created utilizing the image or replication of the image are removed, the counter represented by integer value Y may be decremented. In another example, when Y<2*X, the second replication of the image may be removed. In yet another example, when Y<X, the first replication of the image may be removed.

In this way, an image may be dynamically replicated in response to container instance creation in order to avoid image contention during the creation of additional container instances based on that image.

In a large cluster which contains many compute nodes, a single image copy may experience contention. The large scale of data analysis/HPC workloads can put significant pressure on a single image copy as often, thousands of containers are started simultaneously from the same image.

In one embodiment, to mitigate the contention effectively, a contention manager automatically creates replicas of layers when the contention on that layers increases. One exemplary strategy is to use a global reference counter to record the number of times a layer is referenced by a container. Each time the counter exceeds the multiple of a threshold parameter, a new replica will be created, and once the value of the counter is reduced to the multiple of a threshold, a replica will be removed. The threshold value may be decided based on the specific cluster setup and/or user preference. In this way, the layered structure of container images may be used to reduce the amount of replication overhead in terms of storage space and bandwidth. Different replication policies may also be defined (e.g. based on the access frequency of files in a layer, etc.).

Additionally, image contention may be mitigated by dynamically replicating images based on one or more metrics (e.g. the number of containers referencing an image or the number of files being access in a layer, etc.).

Figure 8:
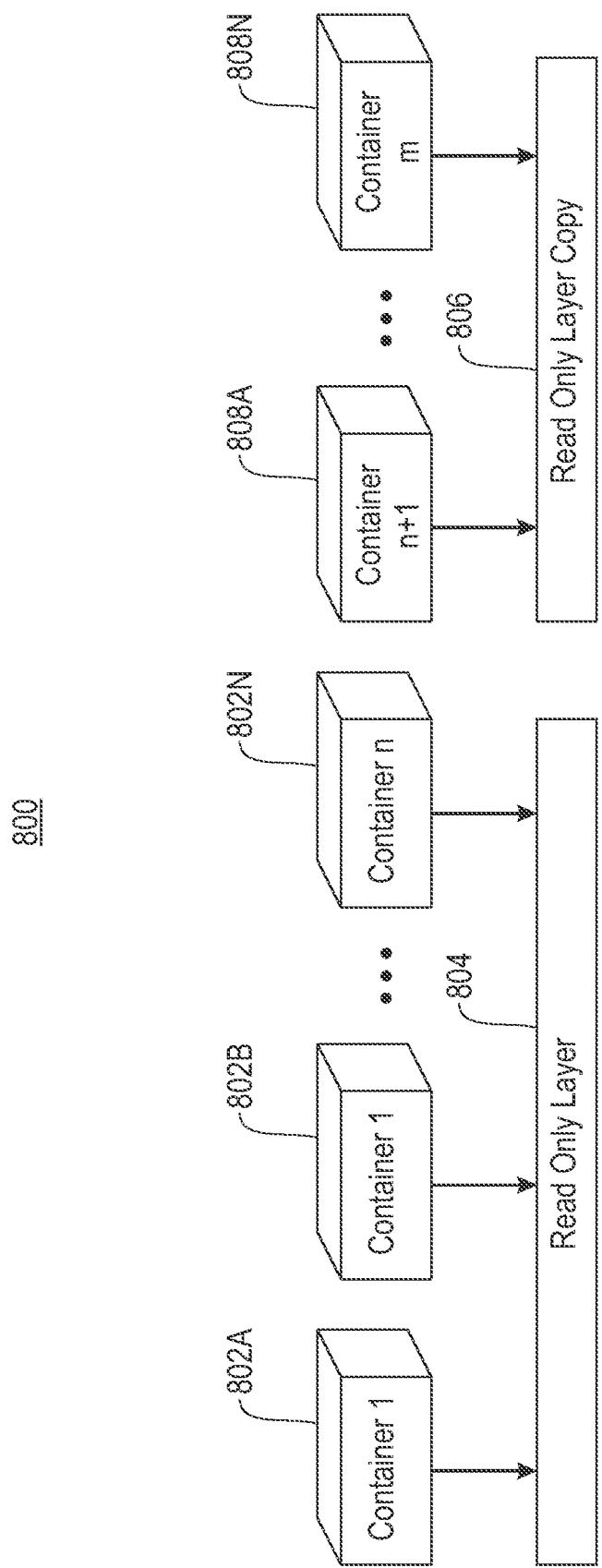
FIG. 8 illustrates an exemplary contention mitigation implementation, in accordance with one embodiment.

FIG. 8 illustrates an exemplary contention mitigation implementation 800, according to one exemplary embodiment. As shown in FIG. 8, a plurality of container instances 802A-N are created (e.g., by a plurality of daemons running on nodes within a system), utilizing a single read only layer 804 of an image. As each of the plurality of container instances 802A-N are created, a reference count is incremented and compared to a threshold amount that is set based on a configuration of nodes within the system.

Additionally, in response to determining that the incremented reference count exceeds the threshold amount, a copy 806 is made of the single read only layer 804, and additional container instances 808A-N are created utilizing the copy 806. In this way, popular layers may be automatically replicated when the reference count exceeds the threshold.

Migration Manager

Figure 9:
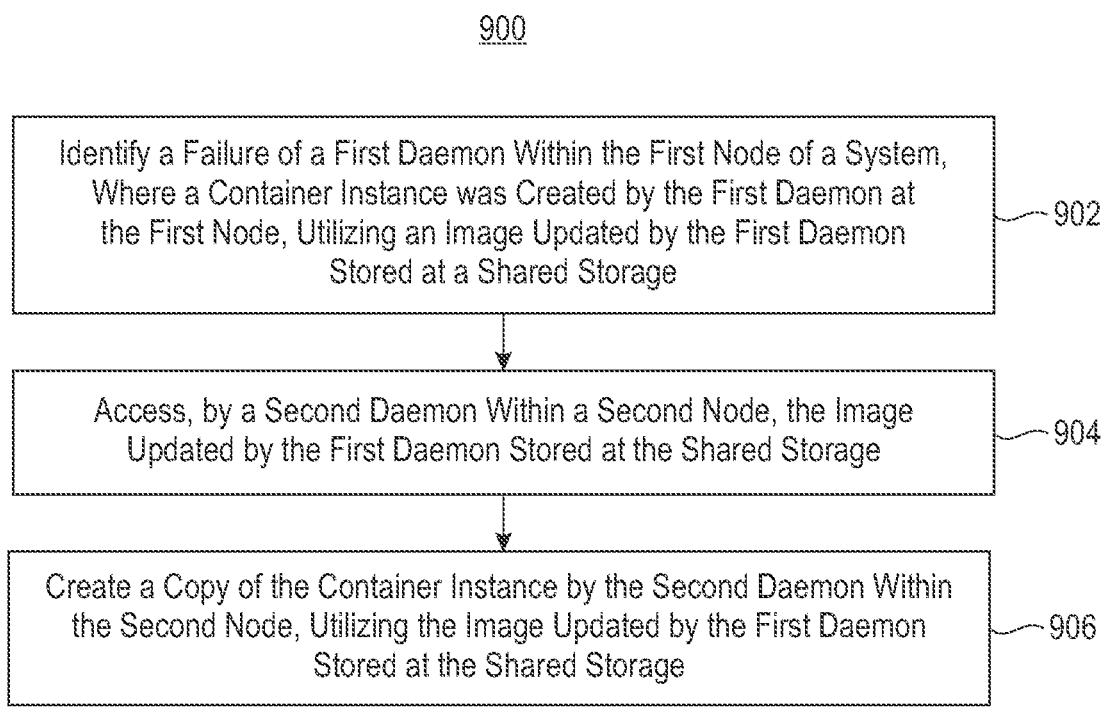
FIG. 9 illustrates a flowchart of a method for managing live migration within a shared image containerized environment, in accordance with one embodiment.

Now referring to FIG. 9, a flowchart of a method 900 for managing live migration within a shared image containerized environment is shown, according to one embodiment. The method 900 may be performed in accordance with the present invention in any of the environments depicted in FIGS. 1-4, 6, 8, 10, and 12, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a failure of a first daemon within the first node of a system is identified, where a container instance was created by the first daemon at the first node, utilizing an image updated by the first daemon stored at a shared storage. In one embodiment, the system may include a containerized environment. In another embodiment, the first node of the system may include a process node within a process layer of the system.

Additionally, in one embodiment, the container instance may be created within the first node by the first daemon. In another embodiment, the first daemon may include a service running on the first node within the system. In yet another embodiment, the shared storage may include storage accessible by a plurality of different nodes/daemons within the system. In still another embodiment, the image may include a template used to create the container instance within a containerized environment.

Further, in one embodiment, before the failure of the first daemon, the first daemon may update the image within the shared storage to create an updated image. For example, the first daemon may write to one or more files within the image stored at the shared storage. In another example, the first daemon may update one or more of software, configuration files, and parameters of the image to create the updated image.

Further still, in one embodiment, the failure of the first daemon may be caused by a failure of the first node on which the first daemon is running. In another embodiment, the failure of the first node may be caused by overloading, power loss, malware, one or more hardware and/or software errors, etc.

Also, method 900 may proceed with operation 904, where the image updated by the first daemon stored at the shared storage is accessed by a second daemon within a second node. In one embodiment, the updated image may be accessed by the second daemon at the shared storage. In another embodiment, the second daemon may send a read request for the updated image to the shared storage. In yet another embodiment, the first node and the second node may both be compute nodes within a single system. In still another embodiment, both the first daemon and the second daemon may have access to the shared storage within the system.

In addition, method 900 may proceed with operation 906, where a copy of the container instance is created by the second daemon within the second node, utilizing the image updated by the first daemon stored at the shared storage. In one embodiment, the second daemon may utilize the updated image to create the copy of the container instance at the second node.

In this way, the container instance may be migrated from the first daemon and the first node to the second daemon and the second node, utilizing the image stored at the shared storage. This may facilitate container instance migration, which may reduce an amount of processing and resources necessary to implement container instance migration within a system, which may in turn improve a functioning of one or more nodes performing container instance migration within the system. This may also reduce an amount of data transfer during container instance migration, which may increase an available system bandwidth, which may improve a functioning of one or more nodes within the system.

Fast container migration is useful for fault tolerance and optimized resource management in a cluster. A migration manager may allow to migrate containers between hosts with low overhead.

Figure 10:
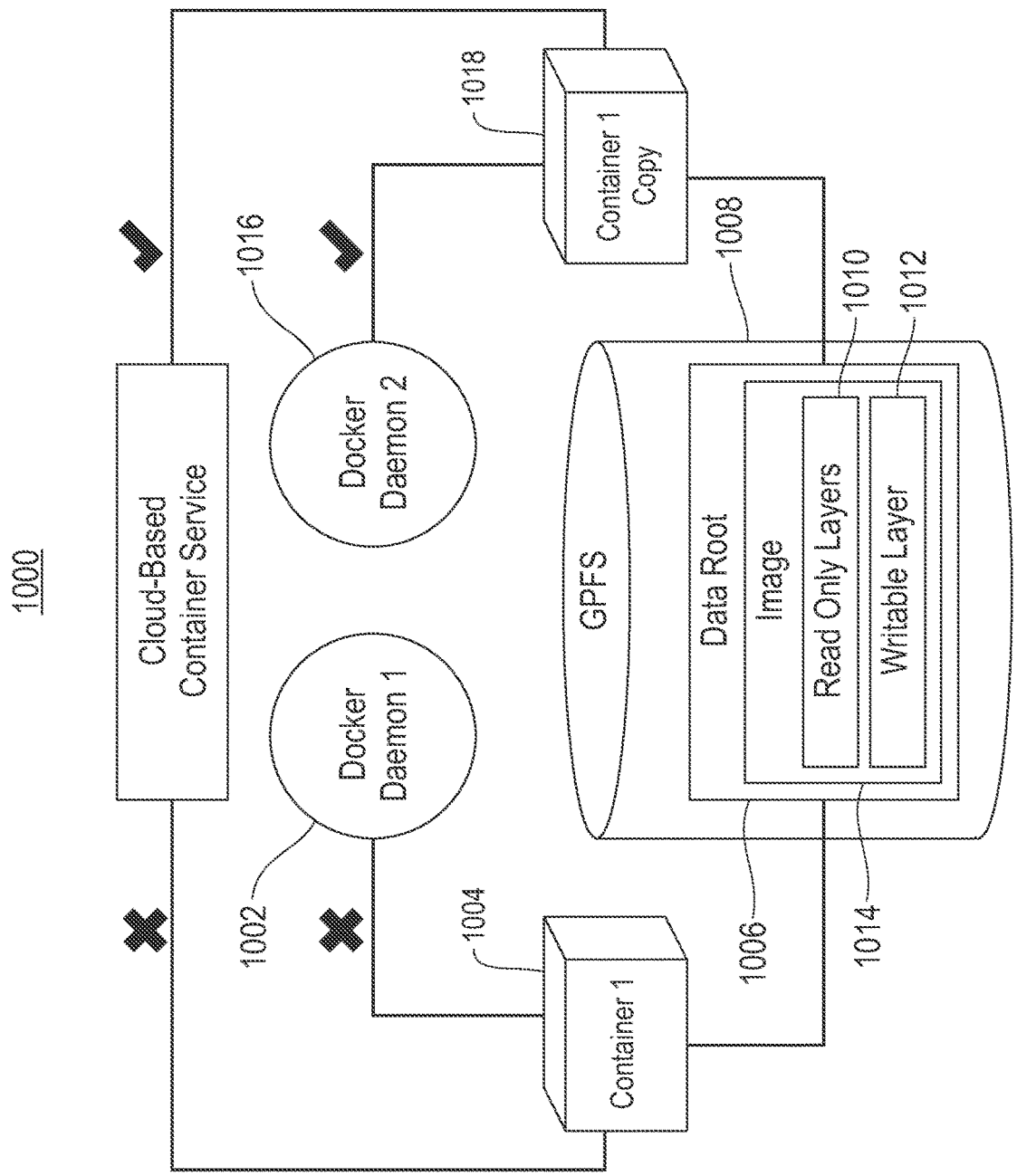
FIG. 10 illustrates an exemplary live migration implementation, in accordance with one embodiment.

FIG. 10 illustrates an exemplary live migration implementation 1000, according to one exemplary embodiment. As shown in FIG. 10, when a first daemon 1002 receives a request for creating a first container instance 1004, it will union read only layers 1010 of an image 1014 and a new, writable layer 1012 to provision the file system for the first container instance 1004. By default, the mount point for this union file system is located in a data root directory 1006 on shared storage 1008. As a result, the writable layer 1012, which contains all local modifications to the file system of the first container instance 1004 and the container instance's runtime configuration, is also accessible from different hosts (e.g., a second daemon 1016 running on a second host, etc.).

Hence, to migrate a container, the migration manager keeps both the writable layer 1012 and the runtime configuration when shutting down the first container instance 1004 and then spawns a copy 1018 of the container instance using a second daemon 1016 on a second host which can still access and reuse all persisted state from the stopped first container instance 1004.

In this way, all daemons within a system may access the writable layer 1012 for an image. This may reduce an overhead needed for container migration/failover, and may make migration transparent to end users. This may also expedite migration and enable more efficient cluster resource scheduling.

Local Writeable Layer

Now referring to FIG. 11, a flowchart of a method 1100 for implementing a local writeable layer within a shared image containerized environment is shown, according to one embodiment. The method 1100 may be performed in accordance with the present invention in any of the environments depicted in FIGS. 1-4, 6, 8, 10, and 12, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where a first update is written to an image by a daemon within a node of a system, where the first update is written to local storage within the node. In one embodiment, the daemon may create and run a container instance at the node, utilizing the image. In another embodiment, after creating the container instance, the daemon may write the first update to the image. In yet another embodiment, the first update may include an update one or more of software, configuration files, and parameters of the image. Additionally, in one embodiment, the daemon may include a service running on the node within the system. In another embodiment, the first update may be written to a writeable layer of the image used to create the container instance. In yet another embodiment, the local storage may include physical storage within the node. For example, the node may include a computing device such as a server, and the physical storage may include one or more hard disk drives, one or more flash memory drives, one or more solid state drives (SSDs), one or more random access memory (RAM) modules, etc.

Further, method 1100 may proceed with operation 1104, where a second update to the image is written by the daemon within the node of the system, where the second update is written to the local storage within the node. In one embodiment, the second update may include an update one or more of software, configuration files, and parameters of the image that is separate from the first update. In another embodiment, the second update may be grouped with the first update within the local storage of the node. In yet another embodiment, the second update may be written with the first update to the writeable layer of the image used to create the container instance.

Further still, method 1100 may proceed with operation 1106, where the first update to the image and the second update to the image are written as a single write to shared storage within the system. In one embodiment, writing the first update to the image and the second update to the image may include applying the first update and the second update to the image at the shared storage to create an updated image within the shared storage. In another embodiment, the first update and the second update may be written to the shared storage as a single data block in response to a predetermined time schedule.

Also, in one embodiment, writing the first and second updates to the shared storage may include flushing the writeable layer of the image from the local storage to the shared storage. For example, the writeable layer may be sent from the local storage to the shared storage. In another example, the writeable layer may be stored with additional layers associated with the image (e.g., one or more read-only layers, etc.).

In addition, in one embodiment, the first update and the second update may be written to the shared storage in response to determining that a predetermined number of local writes have been performed by the daemon within the node of the system. In another embodiment, the shared storage may be accessible to a plurality of different daemons running on a plurality of different nodes within the system.

In this way, a plurality of separate updates to an image may be compiled locally at a node before being asynchronously applied to the image at shared storage, instead of being immediately and synchronously applied to the image at shared storage as they are made. This may reduce an amount of write operations that are performed from the node to the shared storage. This may also decrease a write latency for the container instance running on the node.

Figure 12:
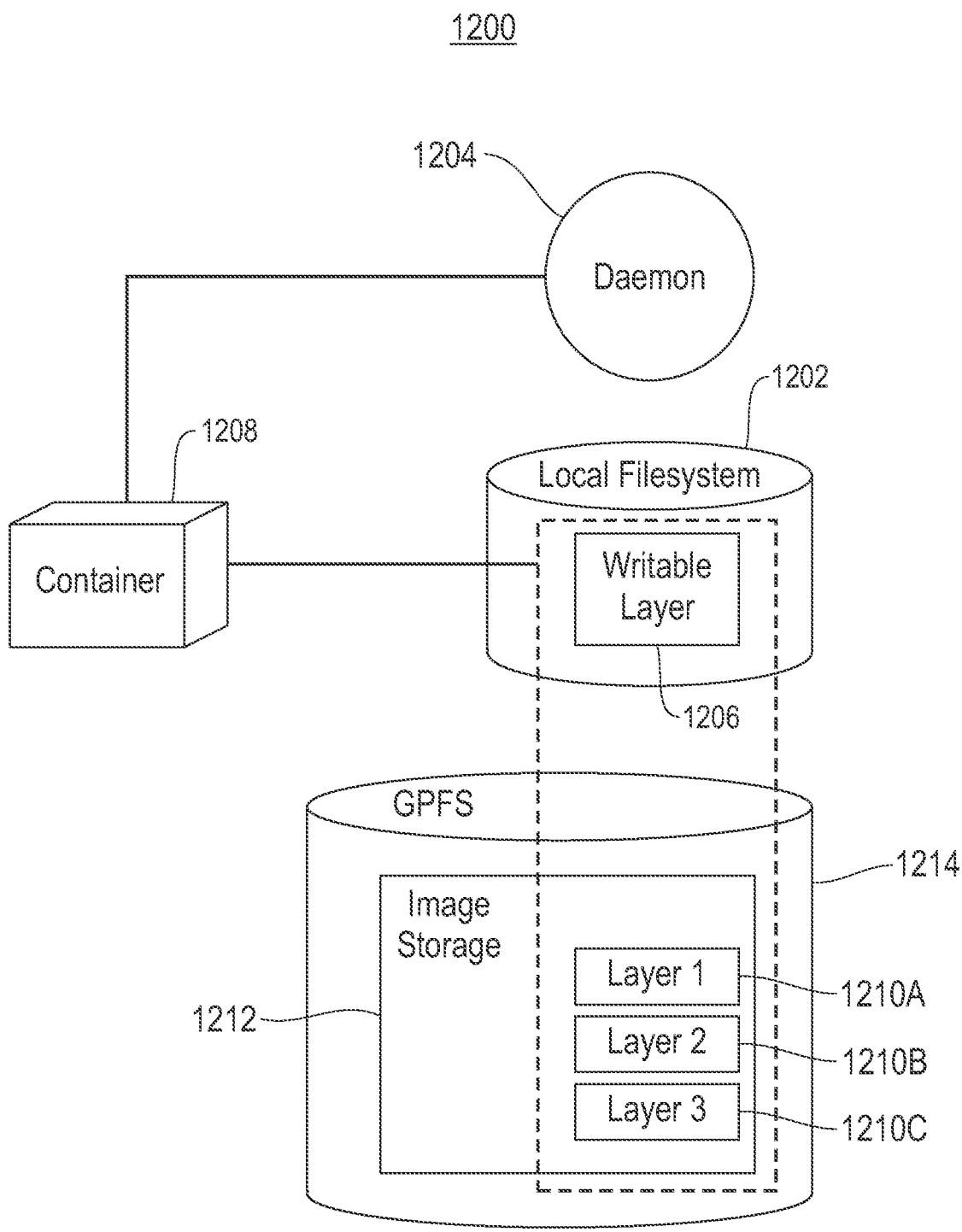
FIG. 12 illustrates an exemplary local writeable layer implementation, in accordance with one embodiment.

FIG. 12 illustrates an exemplary local writeable layer implementation 1200, according to one exemplary embodiment. As shown in FIG. 12, local storage 1202 is available for a daemon 1204, and option is provided to set write affinity, which allows the daemon 1204 to store the writeable layer 1206 of a container instance 1208 in local storage. This optimization can reduce write latencies as remote accesses are avoided.

To still offer fast container migration, the migration manager will periodically flush local changes to the writeable layer 1206 to shared storage 1214 so that they can be added to read only layers 1210A-C for the image 1212, and may be reused in case of a node failure or do not have to be copied in case of a planned migration.

In this way, write latencies may be reduced by storing the writable layer locally if local storage is available.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for managing contention, the computer program product comprising a computer readable storage medium having program instructions embodied therewith, wherein the computer readable storage medium is not a transitory signal per se, the program instructions executable by a processor to cause the processor to perform a method comprising:
creating, by the processor, a container instance by combining multiple shared read only layers and a dedicated writable layer within an image;
incrementing, by the processor, a counter associated with the image in response to the creation of the container instance using the image;
comparing, by the processor, the counter to a threshold value; and
creating a second instance of the image, by the processor, in response to determining that the counter exceeds the threshold value.

2. The computer program product of claim 1, wherein:
the image is stored in a shared storage layer that includes shared storage shared by a plurality of different daemons,
each of the plurality of different daemons runs on a separate compute node within a compute layer separate from the shared storage layer, and
one of the plurality of different daemons creates the container instance utilizing the image stored at the shared storage layer.

3. The computer program product of claim 1, wherein the container instance is created utilizing a daemon, where the daemon includes a service running on a compute node within a system.

4. The computer program product of claim 1, wherein the counter includes a global reference counter that includes an integer value that is incremented each time a container instance is created utilizing the image.

5. The computer program product of claim 1, wherein a separate counter is associated with each of a plurality of images stored within a system.

6. The computer program product of claim 1, wherein the threshold value includes an integer value that is determined based on a system setup.

7. The computer program product of claim 1, wherein the threshold value is increased in response to creating the second instance of the image.

8. The computer program product of claim 1, wherein the image includes one or more instructions used to create the container instance by a daemon within a containerized environment.

9. The computer program product of claim 1, wherein each daemon of a plurality of daemons is located on a separate compute node, and creates a container instance at their respective compute node utilizing a single instance of the image within shared storage.

10. The computer program product of claim 1, wherein:
a new counter is associated with the second instance of the image.

11. The computer program product of claim 1, further comprising removing, by the processor, a replication of the image in response to determining that the counter no longer exceeds the threshold value.

12. A computer implemented method, comprising:
creating, by a computer, a container instance by combining multiple shared read only layers and a dedicated writable layer within an image;
incrementing, by the computer, a counter associated with the image in response to the creation of the container instance using the image;
comparing, by the computer, the counter to a threshold value; and
creating a second instance of the image, by the computer, in response to determining that the counter exceeds the threshold value.

13. The method of claim 12, wherein:
the image is stored in a shared storage layer that includes shared storage shared by a plurality of different daemons,
each of the plurality of different daemons runs on a separate compute node within a compute layer separate from the shared storage layer, and
one of the plurality of different daemons creates the container instance utilizing the image stored at the shared storage layer.

14. The method of claim 12, wherein the container instance is created utilizing a daemon, where the daemon includes a service running on a compute node within a system.

15. The method of claim 12, wherein the counter includes a global reference counter that includes an integer value that is incremented each time a container instance is created utilizing the image.

16. The method of claim 12, wherein a separate counter is associated with each of a plurality of images stored within a system.

17. A computer implemented method, comprising:
incrementing, by a computer, a counter associated with an image in response to a creation of a container instance using the image;
comparing, by the computer, the counter to a threshold value; and conditionally replicating the image, by the computer, based on the comparing, where replicating the image includes:
  creating, by the computer, a second instance of the image within shared storage,
  associating, by the computer, a new counter with the second instance of the image, and
  increasing, by the computer, the threshold value with an integer multiplier value.

18. A computer implemented method, comprising:
incrementing, by a computer, a counter associated with an image in response to a creation of a container instance using the image;
comparing, by the computer, the counter to a threshold value;
conditionally replicating the image, by the computer, based on the comparing; and
removing, by the computer, a replication of the image in response to determining that the counter no longer exceeds the threshold value.

* * * * *